(12) United States Patent
Loofbourrow et al.

(10) Patent No.: US 9,058,346 B2
(45) Date of Patent: Jun. 16, 2015

(54) ORDERED INDEX

(71) Applicant: Apple Inc., Cupertino, CA (US)

(72) Inventors: Wayne Loofbourrow, San Jose, CA (US); John Martin Hornkvist, Cupertino, CA (US); Eric Richard Koebler, Aptos, CA (US); Yan Arrouye, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/295,135

(22) Filed: Jun. 3, 2014

(65) Prior Publication Data

US 2014/0351244 A1     Nov. 27, 2014

Related U.S. Application Data

(60) Continuation of application No. 13/231,045, filed on Sep. 13, 2011, now Pat. No. 8,775,435, which is a division of application No. 12/833,921, filed on Jul. 9, 2010, now Pat. No. 8,024,322, which is a division of application No. 11/760,682, filed on Jun. 8, 2007, now Pat. No. 7,765,213.

(51) Int. Cl.
    *G06F 17/30*         (2006.01)

(52) U.S. Cl.
    CPC .... *G06F 17/30321* (2013.01); *G06F 17/30622* (2013.01); *G06F 17/30* (2013.01); *G06F 17/30424* (2013.01); *G06F 17/30598* (2013.01)

(58) Field of Classification Search
    CPC ....................................................... G06F 17/30
    USPC ................................................... 707/600–899
    See application file for complete search history.

(56) References Cited

U.S. PATENT DOCUMENTS

| | | |
|---|---|---|
| 2006/0041606 A1 | 2/2006 | Sawdon |
| 2006/0259482 A1 | 11/2006 | Altevogt et al. |
| 2007/0185871 A1* | 8/2007 | Canright et al. .................. 707/7 |

* cited by examiner

*Primary Examiner* — Isaac M Woo
(74) *Attorney, Agent, or Firm* — Blakely, Sokoloff, Taylor & Zafman LLP

(57) ABSTRACT

Systems and methods for processing an index are described. A postings list of items containing a particular term are ordered in a desired retrieval order, e.g., most recent first. The ordered items are inserted into an inverted index in the desired retrieval order, resulting in an ordered inverted index from which items may be efficiently retrieved in the desired retrieval order. During retrieval, items may first be retrieved from a live index, and the retrieved items from the live and ordered indexes may be merged. The retrieved items may also be filtered in accordance with the items' file grouping parameters.

21 Claims, 6 Drawing Sheets

ORDERED INDEX

This application is a continuation of co-pending U.S. patent application Ser. No. 13/231,045 filed on Sep. 13, 2011, which is a divisional of U.S. patent application Ser. No. 12/833,921, filed on Jul. 9, 2010, now issued as U.S. Pat. No. 8,024,322, which is a divisional of U.S. patent application Ser. No. 11/760,682, filed on Jun. 8, 2007, now issued as U.S. Pat. No. 7,765,713.

BACKGROUND

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's PhotoShop. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user give the file a name. Further, these file management systems often allow a user to find a file by searching not only the content of a file, but also by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. This search capability searches through information which is the same for each file, regardless of the type of file. Thus, for example, the searchable data for a Microsoft Word file is the same as the searchable data for an Adobe PhotoShop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. Some file management systems, such as the Finder program, allow users to find a file by searching through the metadata.

In a typical system, the various content, file, and metadata are indexed for later retrieval using a program such as the Finder program, in what is commonly referred to as an inverted index. For example, an inverted index might contain a list of references to documents in which a particular word appears. Given the large numbers of words and documents in which the words may appear, an inverted index can be extremely large. The size of an index presents many challenges in processing and storing the index, such as updating the index or using the index to perform a search.

SUMMARY OF THE DETAILED DESCRIPTION

Methods and systems for processing an inverted index in a data process ng system are described herein.

According to one aspect of the invention, a method for preparing an ordered inverted index is described that, among other advantages, allows for faster retrieval of items from the index. While scanning items to index the terms that the items contain, a postings list of items containing a particular term are ordered in a desired retrieval order. The ordered items are inserted from the postings list into an index the desired retrieval order to create an ordered inverted index. During retrieval, items from the ordered inverted index are returned in the desired retrieval order more quickly and efficiently than if they were retrieved from a conventional unordered index.

According to one aspect of the invention, additional efficiency in retrieving items in the desired retrieval order may be realized by generating a second inverted index separate from the ordered inverted index, where the second inverted index is generated from live items, i.e., recently created or updated items that represent current, or "live," updates to the ordered inverted index. During retrieval, the live items are retrieved from the second inverted index and returned first to insure that the live items are returned before other items from the ordered inverted index.

According to one aspect of the invention, further efficiency in retrieval of items from an inverted index may be achieved by storing the indexed items' file grouping parameters separately, outside the inverted index. During later retrieval, an item's file grouping parameters can be read very quickly, and only query results for selected groups need be evaluated further.

BRIEF DESCRIPTION OF THE DRAWINGS

The present invention is illustrated by way of example and not limitation in the figures of the accompanying drawings in which like references indicate similar elements.

DETAILED DESCRIPTION

The embodiments of the present invention will be described with reference to numerous details set forth below, and the accompanying drawings will illustrate the described embodiments. As such, the following description and drawings are illustrative of embodiments of the present invention and are not to be construed as limiting the invention. Numerous specific details are described to provide a thorough understanding of the present invention. However, certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2007.

Figure 1:
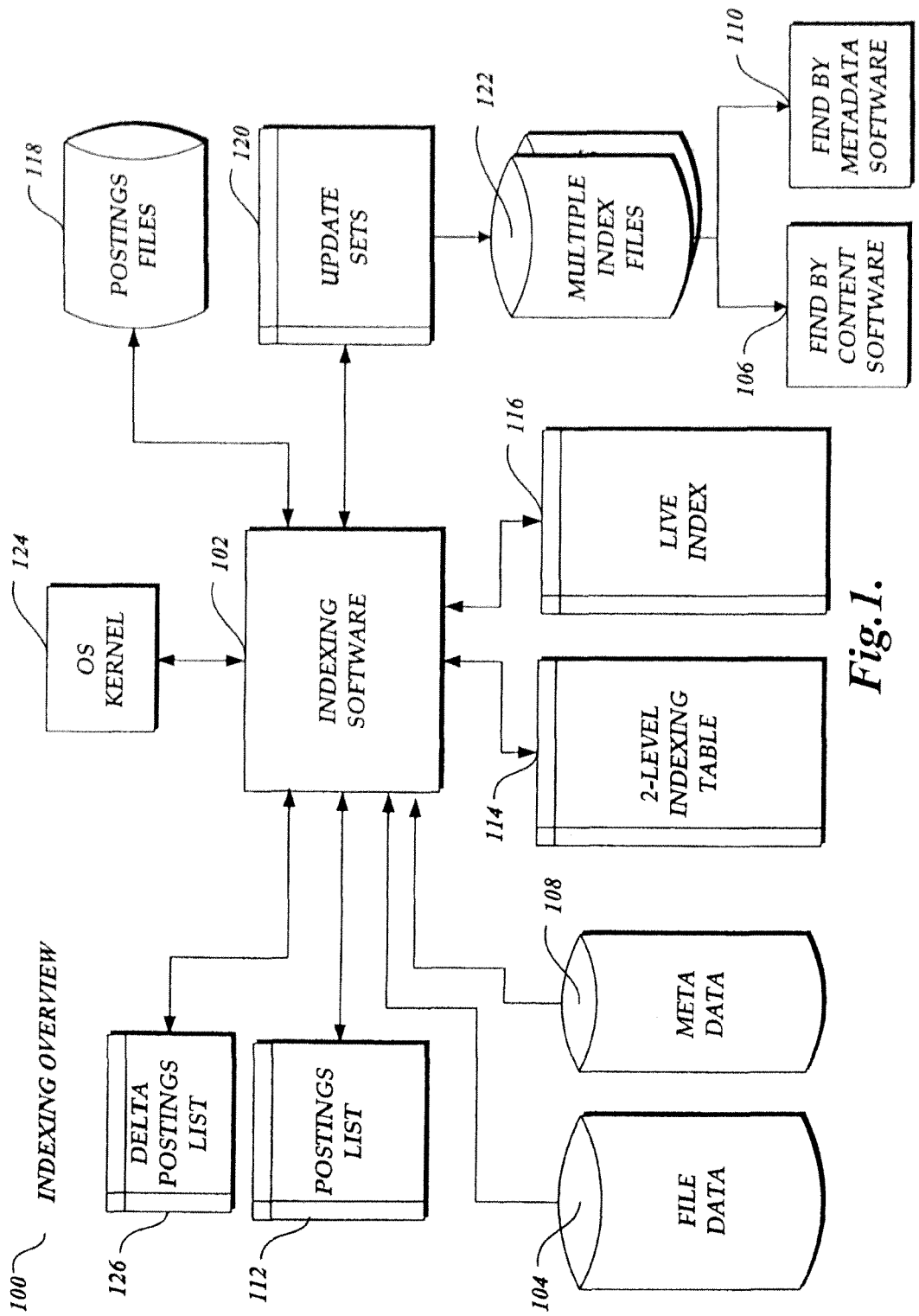
FIG. 1 is a block diagram overview of an architecture for processing a inverted index according to one exemplary embodiment of the invention.
Figure 4:
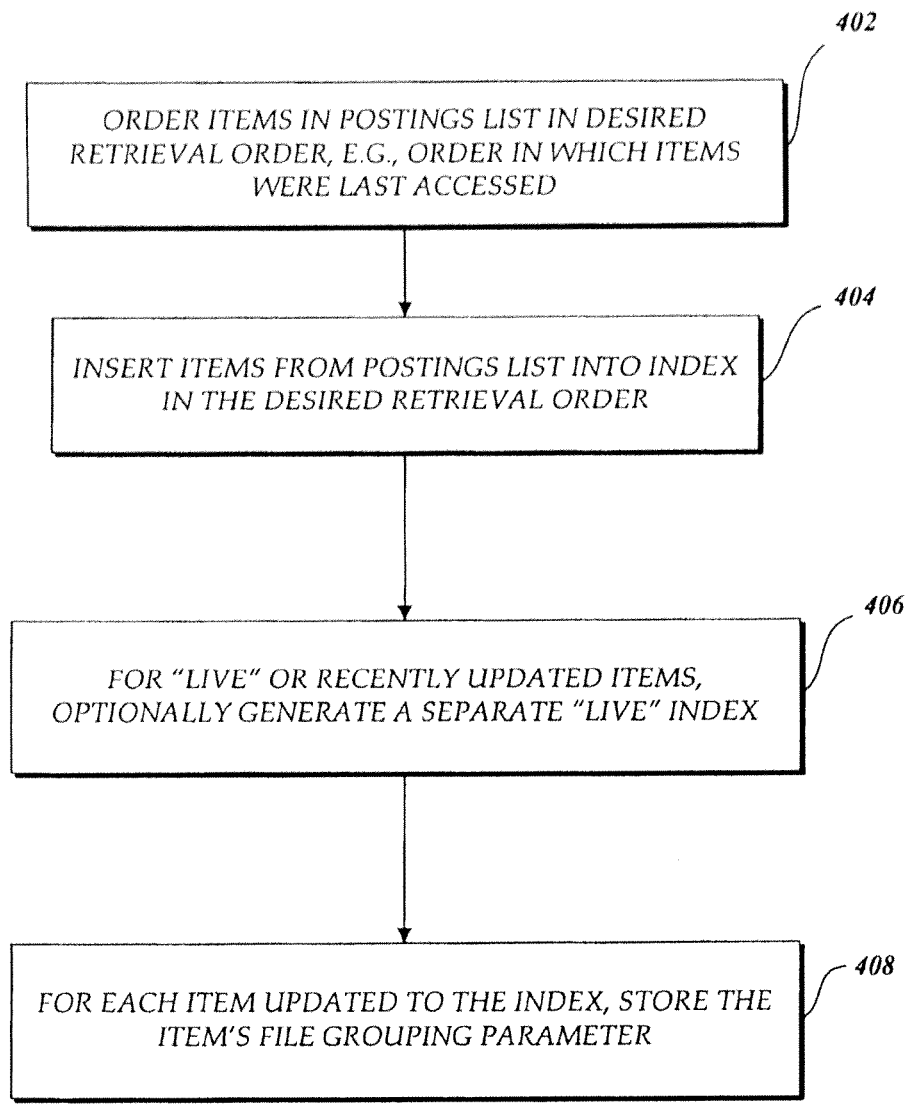
FIGS. 4-5 are flow diagrams illustrating certain aspects of performing a method of processing an ordered index according to one exemplary embodiment of the invention.
Figure 5:
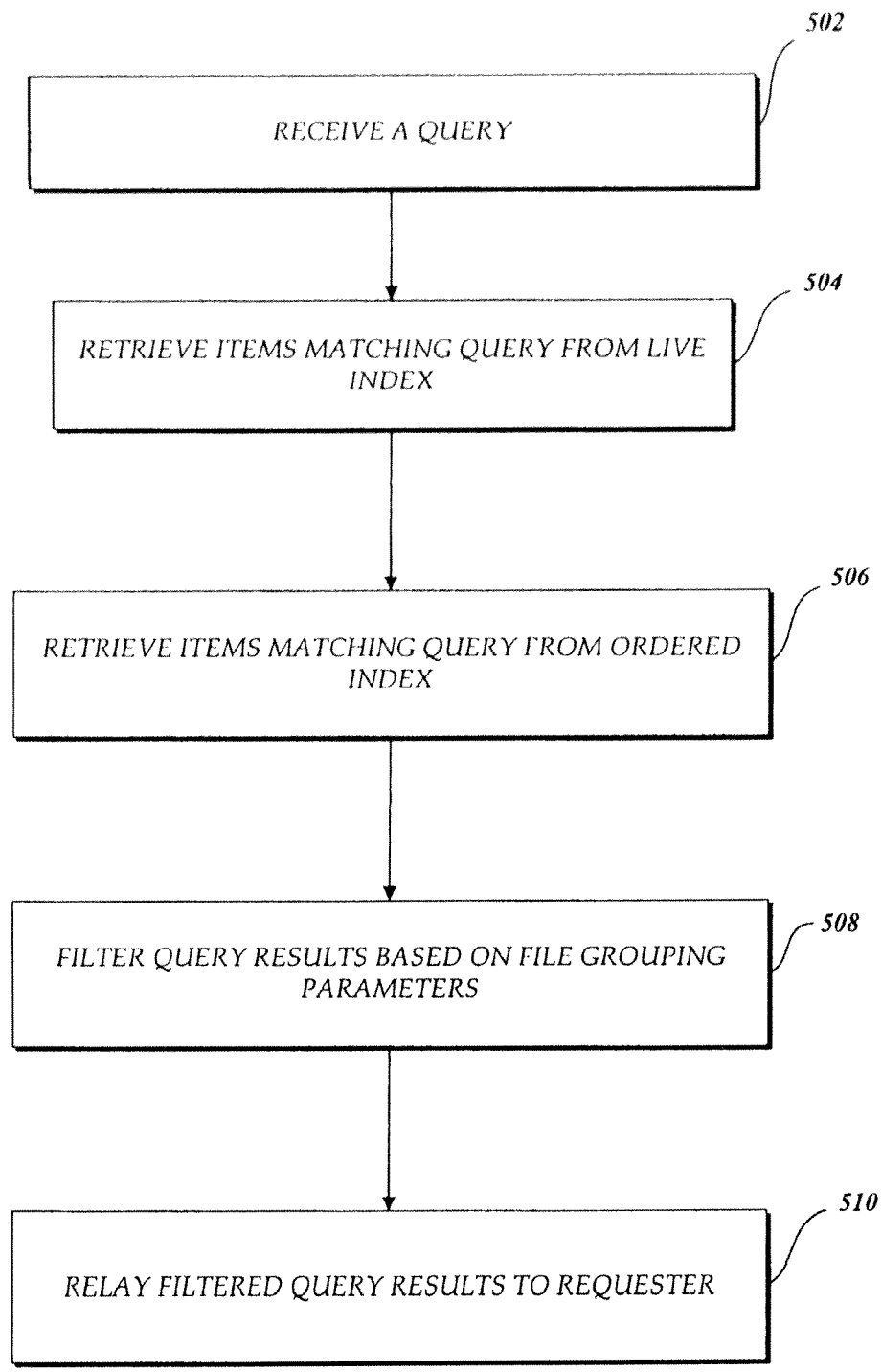

Various different software architectures may be used to implement the functions and operations described herein, such as to perform the methods shown in FIGS. 4-5. The following discussion provides one example of such an architecture, but it will be understood that alternative architectures may also be employed to achieve the same or similar results. The software architecture 100 shown in FIG. 1 is an example which is based upon the Macintosh operating system. The architecture 100 includes indexing software 102 and an operating system (OS) kernel 124 which is operatively coupled to the indexing software 102, as well as other software programs, such as find by content software 106 and find by metadata software 110 (which may be the Finder program referenced earlier), and other applications not shown.

In one exemplary embodiment, the find by content software 106 and/or the find by metadata software 110 is used to find a term present in the file data 104 or meta data 108. For example, the software 106/110 may be used to find text and other information from word processing or text processing files created by word processing programs such as Microsoft Word, etc.

The find by content software 106 and find by metadata software 110 are operatively coupled to databases which include one or more indexes 122. The indexes 122 represent at least a subset of the data files in a storage device, including file data 104 and meta data 108, and may include all of the data files in a particular storage device (or several storage devices), such as the main hard drive of a computer system. The one or more indexes 122 comprise an indexed representation of the content and/or metadata of each item stored on the data files 104/108, such as a text document, music, video, or other type of file. The find by content software 106 searches for a term in that content by searching through the one or more index files 122 to see if the particular term, e.g., a particular word, is present in items stored on data files 104 which have been indexed. The find by content software functionality is available through find by metadata software 110 which provides the advantage to the user that the user can search the indexes 122 for the content 104 within an item stored on the data files 104 as well as any metadata 108 that may have been generated for the item.

In one embodiment of the present invention, indexing software 102 is used to create and maintain the one or more indexes 122 that are operatively coupled to the find by content and metadata software applications 106/110. Among other functions, the indexing software 102 receives information obtained by scanning the file data 104 and meta data 108, and uses that information to generate a postings list 112 that identifies an item containing a particular term, or having metadata containing a particular term. As such, the postings list 112 is a type of inverted index that maps a term, such as a search term, to the items identified in the list. In a typical embodiment, the information obtained during the scan includes a unique identifier that uniquely identifies the item containing the particular term, or having metadata containing the term. For example, items such as a word processing or text processing file have unique identifiers, referred to as ITEMIDs. The ITEMIDs are used when generating the postings list 112 to identify those items that contain a particular term, such as the word "Apple." ITEMIDs identifying other types of files, such as image files or music files, may also be posted to the postings list 112, in which case the ITEMID typically identifies items having metadata containing a particular term.

In one embodiment, the indexing software 102 accumulates postings lists 112 for one or more terms into one or more update sets 120 and, from time to time, flushes the updates sets 120 into one or more index files 122. The postings lists 112 for one or more items may also be stored in a postings file 118. The indexing software 102 may employ one or more indexing tables 114 that comprise one or more term tables, including a two-level table that separates the more frequently occurring terms from the less frequently occurring terms. The tables 114 may also include a postings table that comprises one or more postings lists for the terms that are being indexed. In one embodiment, the indexing software may maintain a live index 116 to contain the most current index. In some cases, updates to an index may be generated in a delta postings list 126 that is a specially marked postings list that may be dynamically applied to an index 122, postings files 118, updates sets 120, or other forms of an index in order to insure that the most current information is returned whenever those indexes are accessed.

Figure 2:
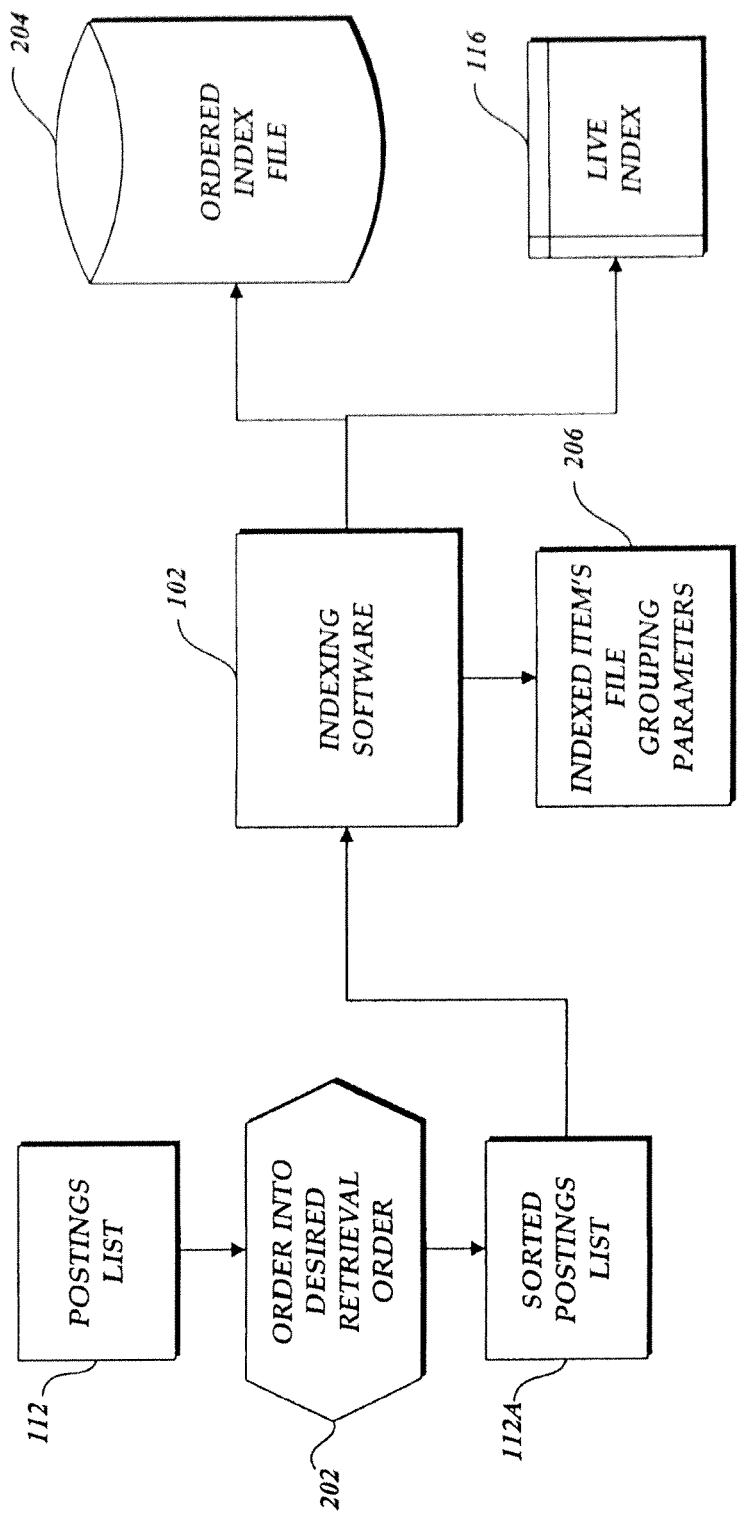
FIG. 2 is a block diagram illustrating one aspect of processing an ordered index according to one exemplary embodiment of the invention.

FIG. 2 is a block diagram illustrating one aspect of processing an ordered index according to one exemplary embodiment of the invention. As shown, a postings list 112 is ordered into a desired retrieval order 202 resulting in a sorted postings list 112A. Typically, the desired retrieval order 202 is the order in which the items contained in the list were last accessed, modified, or received, i.e., a reverse time order, with more recently accessed items first and less recently accessed items last. However, other retrieval orders may be specified, such as the alphabetical order of the name of the item.

In a typical embodiment, indexing software 102 is operatively coupled to the sorted postings list 112, which serves as an input to the indexing software 102 during the creating or updating of an ordered index file 204. The ordered index file 204 is an inverted index that is created from items that have been posted or sorted into a desired retrieval order. Accordingly, the indexing software 102 inserts the items from the sorted postings list 112A into the ordered index file 204 in the desired retrieval order. The indexing software 102 also maintains a live index 116 that contains the most recent updates to the ordered index 204.

In one embodiment, the indexing software 102 stores each indexed item's file grouping parameters in a separate store 206. An item's file grouping parameters have values that indicate certain characteristics or other aspects of an item, such as a category into which the item falls, e.g., text, movie, music, etc. and/or the name of the item, etc. One of the parameter values may also indicate a threshold limit value, referred to as a TOP-N value, to be employed when retrieving items in a particular category. For example, the threshold limit value may be 5 items, meaning that, during retrieval from the ordered index 204, only 5 items should returned in any one category, such as only 5 movies, before reaching the TOP-5 limit. Other types of parameters may also be stored in the file grouping parameters store 206.

Figure 3:
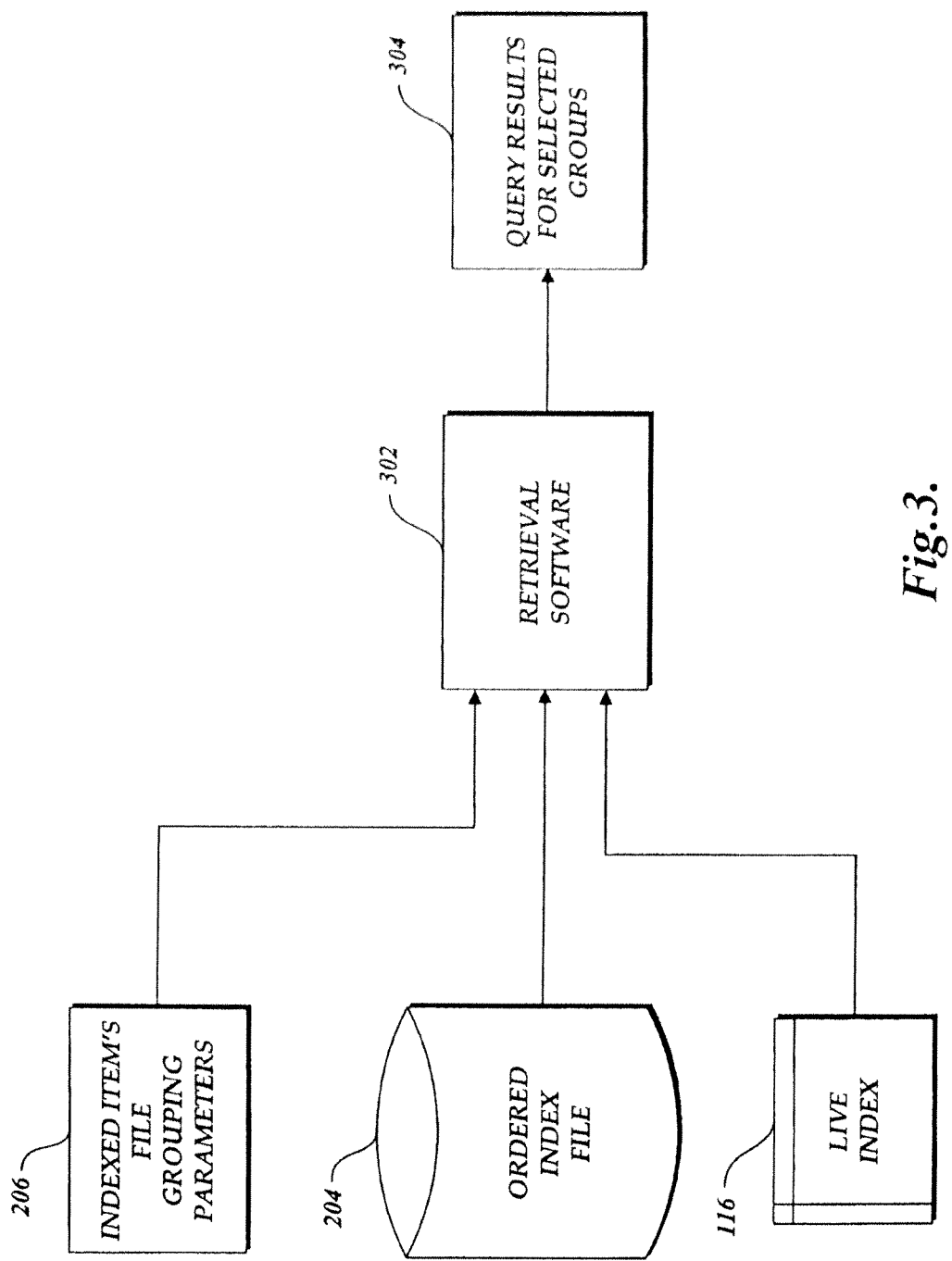
FIG. 3 is a block diagram illustrating another aspect of processing an ordered index according to one exemplary embodiment of the invention.

FIG. 3 is a block diagram illustrating another aspect of processing an ordered index according to one exemplary embodiment of the invention. As shown, the ordered index file 204 is operatively coupled to retrieval software 302 and an indexed item's file grouping parameters 206. The retrieval software operates to retrieve items from the ordered index file 204 in the desired retrieval order 202 and to place the retrieved items into a query result 304. In one embodiment, the retrieval software 302 further operates to interrogate the indexed item's file grouping parameters 206 and to filter the query result 304 in accordance with the indexed item's file grouping parameters 206, including limiting the retrieval to the top-N search results in a particular category, such as a movie, where the "N" value and the "movie" category value are both examples of file grouping parameters 206. Thus, a file grouping parameter may indicate a category of the item being retrieved, e.g., a document, a movie, a presentation, etc., as well as an upper limit or threshold, referred to as a top-N limit. By setting a top-N limit for each category, retrieval of items in one category does not overwhelm the other categories. This results in better performance during retrieval and is more user-friendly.

In one embodiment, the retrieval software 302 is also operatively coupled to a live index 116, in which the most recent updates to an index are maintained. During retrieval, the retrieval software may optionally retrieve items from the live index 116 prior to attempting retrieval of items from the ordered index file to insure that only the most recent results are returned in the query result 304. In one embodiment, the retrieval from the live index 116 and ordered index 204 may be merged together to form the query result 304 that is returned to the user.

FIG. 4-5 are flow diagrams illustrating certain aspects of performing a method of processing an ordered index according to one exemplary embodiment of the invention. In FIG. 4, the method to be performed begins at block 402, in which items in a postings list are ordered into a desired retrieval order. The items are typically ordered as they are posted into the postings list, but may also be ordered after posting to the postings list. At processing block 404, the method continues with inserting items into the ordered index in the desired retrieval order. At block 406, the method continues by optionally generating a separate "live" index for the most recently updated items, referred to as "live" items. Lastly, at block 408, the method stores the item's file grouping parameter(s) for each item that is updated to the ordered index.

In FIG. 5, the method begins at block 502, in which retrieval software that is operatively coupled to an ordered index receives a query from a requestor. At block 504, the retrieval software optionally first retrieves items matching the query from a live index. At block 506, the retrieval software retrieves items matching the query from the ordered index. The results from blocks 504 and 506 may be merged as needed, after which, at block 508 the retrieval software commences filtering the items in the query results based on the retrieved items' file grouping parameters. For example, the filter may allow only the first 5 movies to be returned in a query result set having more than 5 movie matches. Finally, at block 510, the retrieval software relays the filtered results back to the requestor.

Figure 6:
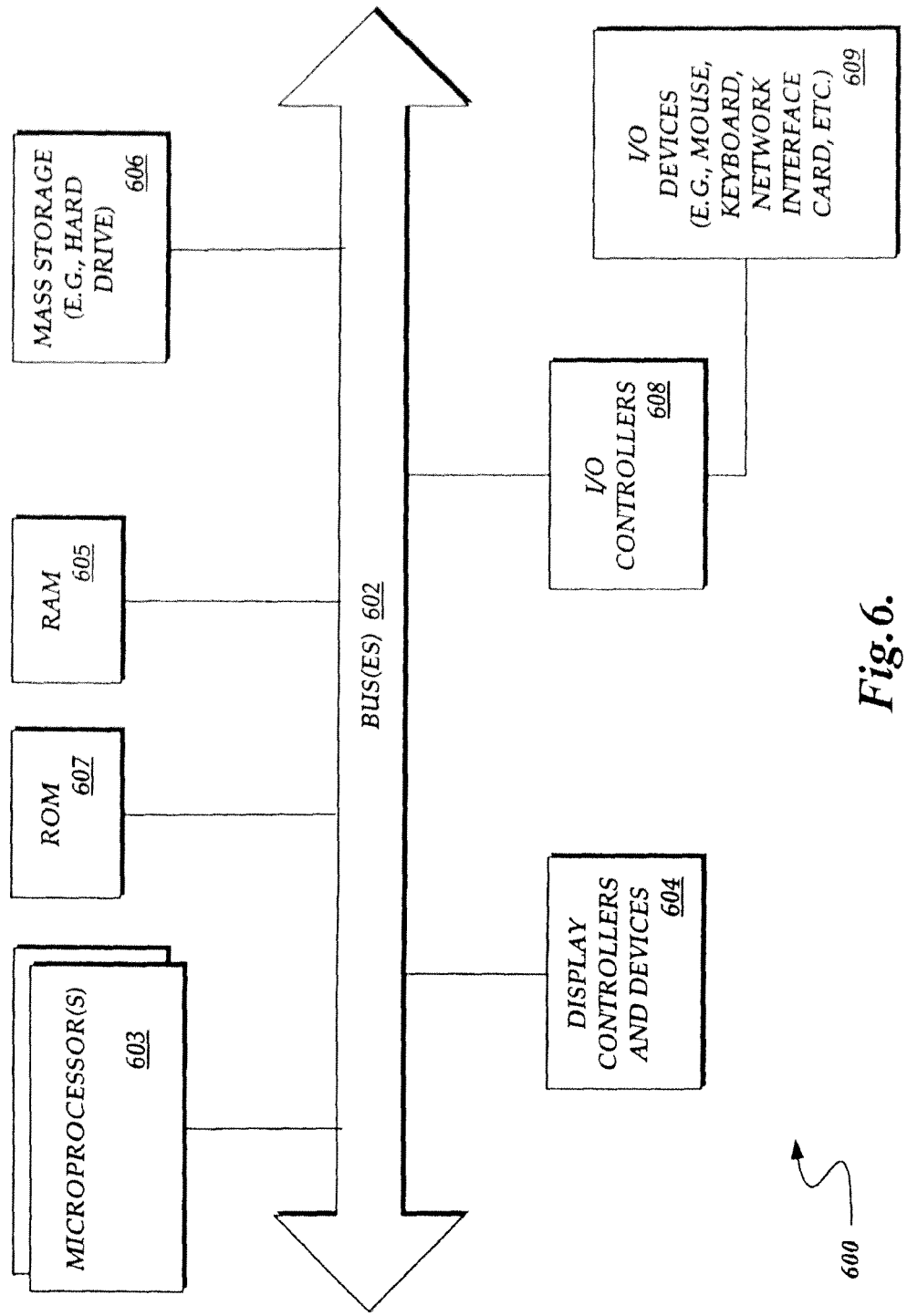
FIG. 6 is a block diagram overview of an exemplary embodiment of a data processing system, which may be a general purpose computer system and which may operate in any of the various methods described herein.

FIG. 6 illustrates an example of a typical computer system which may be used with the present invention. Note that while FIG. 6 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 6 may, for example, be a Macintosh computer from Apple Computer, Inc.

As shown in FIG. 6, the computer system 601, which is a form of a data processing system, includes a bus 602 which is coupled to a microprocessor(s) 603 and a ROM (Read Only Memory) 607 and volatile RAM 605 and a non-volatile memory 606. The microprocessor 603 may be a G3 or G4 microprocessor from Motorola, Inc. or one or more G5 microprocessors from IBM. The bus 602 interconnects these various components together and also interconnects these components 603, 607, 605, and 606 to a display controller and display device 604 and to peripheral devices such as input/output (I/O) devices which may be mice, keyboards, modems, network interfaces, printers and other devices which are well known in the art. Typically, the input/output devices 609 are coupled to the system through input/output controller 608. The volatile RAM (Random Access Memory) 605 is typically implemented as dynamic RAM (DRAM) which requires power continually in order to refresh or maintain the data in the memory. The mass storage 606 is typically a magnetic hard drive or a magnetic optical drive or an optical drive or a DVD RAM or other types of memory systems which maintain data (e.g. large amounts of data) even after power is removed from the system. Typically, the mass storage 606 will also be a random access memory although this is not required. While FIG. 6 shows that the mass storage 606 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 602 may include one or more buses connected to each other through various bridges, controllers and/or adapters as is well known in the art. In one embodiment the I/O controller 608 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 607, RAM 605, mass storage 606 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operation, are described as being performed by or caused by software code to simplify description. However, those skilled in the art will recognize what is meant by such expressions is that the functions result from execution of the code by a processor, such as the microprocessor 603.

What is claimed is:

1. A machine implemented method for preparing an inverted index for storage on a storage medium, the method comprising:
    scanning items containing terms from which an inverted index is prepared;
    inserting the items into the inverted index in an order based on a characteristic of each item; and
    in response to receiving a query from a requestor, presenting items matching the query to the requestor on an output device, the matching items from the inverted index and a live index of scanned items containing terms, wherein the live index is stored on a network storage device and is separate from the inverted index.

2. The method of claim 1, wherein the terms include metadata of the scanned items.

3. The method of claim 1, wherein the characteristic upon which the order is based comprises: a time characteristic of each item or an item name or filename characteristic of each item.

4. The method of claim 1, wherein each scanned item includes grouping parameters, the method further comprising:
receiving grouping parameters from the inverted index;
receiving grouping parameters from the live index;
storing the grouping parameters in a storage separate from the inverted index and the live index, wherein the grouping parameters indicate characteristic values of the scanned item.

5. The method of claim 4, wherein presenting the items matching the query comprises:
receiving first items matching the query from the live index;
receiving second items matching the query from the inverted index;
merging the first and second items into a query result; and
filtering the query result based on grouping parameters of the first and second items.

6. The method of claim 4, wherein the grouping parameters comprise at least one of: a file type of the scanned item, an item name or filename of the scanned item, or a creation or modification date of the scanned item.

7. The method of claim 4, wherein the grouping parameters comprise at least one of: metadata indicating an application that generated the scanned item, or metadata indicating an application that retrieved the scanned item.

8. A non-transitory machine-readable storage medium having instructions which, when executed by a machine, cause the machine to perform a method for preparing an inverted index for storage on a storage medium, the method comprising:
scanning items containing terms from which an inverted index is prepared;
inserting the items into the inverted index in an order based on a characteristic of each item; and
in response to receiving a query from a requestor, presenting items matching the query to the requestor via an output device, the matching items from the inverted index and a live index of scanned items containing terms, wherein the live index is stored on a network storage device and is separate from the inverted index.

9. The medium of claim 8, wherein the terms include metadata of the scanned items.

10. The medium of claim 8, wherein the characteristic upon which the order is based comprises: a time characteristic of each item or an item name or filename characteristic of each item.

11. The medium of claim 8, wherein each scanned item includes grouping parameters, the method further comprising:
receiving grouping parameters from the inverted index;
receiving grouping parameters from the live index;
storing the grouping parameters in a storage separate from the inverted index and the live index, wherein the grouping parameters indicate characteristic values of the scanned item.

12. The medium of claim 11, wherein presenting the items matching the query comprises:
receiving first items matching the query from the live index;
receiving second items matching the query from the inverted index;
merging the first and second items into a query result; and
filtering the query result based on grouping parameters of the first and second items.

13. The method of claim 11, wherein the grouping parameters comprise at least one of: a file type of the scanned item, an item name or filename of the scanned item, or a creation or modification date of the scanned item.

14. The electronic device of claim 11, wherein the grouping parameters comprise at least one of: metadata indicating an application that generated the scanned item, or metadata indicating an application that retrieved the scanned item.

15. An electronic device comprising:
an output device;
a memory;
a network interface configured to communicate with a network storage device;
a processing system programmed with executable instructions that, when executed, perform a machine implemented method comprising:
scanning items containing terms from which an inverted index is prepared;
inserting the items into the inverted index in an order based on a characteristic of each item;
in response to receiving a query from a requestor, presenting items matching the query to the requestor on the output device, the matching items from the inverted index and a live index of scanned items containing terms, wherein the live index is stored on the network storage device and is separate from the inverted index.

16. The electronic device of claim 15, wherein the terms include metadata of the scanned items.

17. The electronic device of claim 15, wherein the characteristic upon which the order is based comprises: a time characteristic of each item or an item name or filename characteristic of each item.

18. The electronic device of claim 15, wherein each scanned item includes grouping parameters, and the method further comprising:
receiving grouping parameters from the inverted index;
receiving grouping parameters from the live index;
storing the grouping parameters in a storage separate from the inverted index and the live index, wherein the grouping parameters indicate characteristic values of the scanned item.

19. The electronic device of claim 18, wherein presenting the items matching the query comprises:
receiving first items matching the query from the live index;
receiving second items matching the query from the inverted index;
merging the first and second items into a query result; and
filtering the query result based on grouping parameters of the first and second items.

20. The electronic device of claim 18, wherein the grouping parameters comprise at least one of: a file type of the scanned item, an item name or filename of the scanned item, or a creation or modification date of the scanned item.

21. The electronic device of claim 18, wherein the grouping parameters comprise at least one of: metadata indicating an application that generated the scanned item, or metadata indicating an application that retrieved the scanned item.

\* \* \* \* \*